United States Patent
Ikeda et al.

(10) Patent No.: US 9,530,385 B2
(45) Date of Patent: Dec. 27, 2016

(54) DISPLAY DEVICE, DISPLAY DEVICE CONTROL METHOD, AND RECORDING MEDIUM

(75) Inventors: Ryuji Ikeda, Osaka (JP); Hitoshi Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 14/348,065

(22) PCT Filed: May 25, 2012

(86) PCT No.: PCT/JP2012/063559
§ 371 (c)(1),
(2), (4) Date: Mar. 28, 2014

(87) PCT Pub. No.: WO2013/084522
PCT Pub. Date: Jun. 13, 2013

(65) Prior Publication Data
US 2014/0225932 A1    Aug. 14, 2014

(30) Foreign Application Priority Data
Dec. 8, 2011    (JP) ................. 2011-269388

(51) Int. Cl.
*G09G 5/00*    (2006.01)
*G09G 5/373*    (2006.01)
*G06F 3/0483*    (2013.01)

(52) U.S. Cl.
CPC ............. *G09G 5/373* (2013.01); *G06F 3/0483* (2013.01); *G06F 2203/04806* (2013.01)

(58) Field of Classification Search
None
See application file for complete search history.

(56) References Cited

U.S. PATENT DOCUMENTS

| 5,021,989 A | * | 6/1991 | Fujisawa | G06F 17/30011 345/661 |
| 2003/0052900 A1 | * | 3/2003 | Card | G06F 3/04815 345/660 |
| 2011/0035702 A1 | * | 2/2011 | Williams | G06F 3/0481 715/800 |

(Continued)

FOREIGN PATENT DOCUMENTS

| CN | 101359276 A | 2/2009 |
| JP | 2007-164550 | 6/2007 |

(Continued)

OTHER PUBLICATIONS

International Search Report for PCT/JP2012/063559, mailed Aug. 7, 2012.

(Continued)

*Primary Examiner* — Ryan R Yang
(74) *Attorney, Agent, or Firm* — Nixon & Vanderhye P.C.

(57) ABSTRACT

A display device includes: a reduction section (15) for displaying, in a case where (i) a part of a content contained in a page is visually recognizable by magnifying and displaying the page at a magnification ratio (8) and (ii) a user conducts a turn-over operation (1), an entire page to be displayed in accordance with the turn-over operation (1); and a magnification section (16) for magnifying a given part of the page at the magnification ratio (8).

10 Claims, 8 Drawing Sheets

(56) References Cited

U.S. PATENT DOCUMENTS

| | | | | |
|---|---|---|---|---|
| 2012/0092330 A1* | 4/2012 | Chen | .................... | G06F 3/0338 |
| | | | | 345/419 |
| 2013/0021281 A1* | 1/2013 | Tse | ...................... | G06F 3/0425 |
| | | | | 345/173 |
| 2014/0292760 A1* | 10/2014 | Shikolay | .............. | G06F 3/0485 |
| | | | | 345/428 |

FOREIGN PATENT DOCUMENTS

| JP | 2009-284081 | 12/2009 |
|---|---|---|
| JP | 2010-277456 | 12/2010 |
| JP | 2011-014076 | 1/2011 |

OTHER PUBLICATIONS

Written Opinion of the ISA PCT/JP2012/063559, mailed Aug. 7, 2012.

\* cited by examiner (a)

(b)

DISPLAY DEVICE, DISPLAY DEVICE CONTROL METHOD, AND RECORDING MEDIUM

This application is the U.S. national phase of International Application No. PCT/JP2012/063559 filed 25 May 2012 which designated the U.S. and claims priority to JP Patent Application No. 2011-269388 filed 8 Dec. 2011, the entire contents of each of which are hereby incorporated by reference.

TECHNICAL FIELD

The present invention relates to a display device etc. capable of displaying an electronic book containing a content across a plurality of pages.

BACKGROUND ART

It has become common to view a book provided as electronic data in a given form (hereinafter referred to as "electronic book"), via an electronic device capable of displaying the electronic data. At least the following facts (1) through (3) appear to form backgrounds of such a rapid diffusion: (1) the electronic book has a great advantage that, unlike a conventional book printed on paper, the electronic book occupies no physical space and is not subjected to aged deterioration, (2) performance of the electronic device has been improved and price-reduction comes along, and (3) advance in computer network technology causes a change in distribution mechanism.

With the rapid diffusion, importance of the improvement in performance of the electronic device has been further increased. Particularly, in a field of information science, attempts have been widely made to improve convenience for a user in terms of software. For example, Patent Literature 1 discloses a method of causing a terminal to display an image content with a plot. With the method, it is possible to display an image in order of the plot while changing a display magnification in accordance with a size of the content.

CITATION LIST

Patent Literature

Patent Literature 1
Japanese Patent Application Publication, Tokukai, 2007-164550 A (Publication Date: Jun. 28, 2007)

SUMMARY OF INVENTION

Technical Problem

According to the electronic device, a user may conduct an operation of magnifying and displaying a page of an electronic book at a given magnification ratio. This is because a display section of the electronic device may have an insufficient resolution or characters of the electronic book may be too small to read.

According to a conventional electronic device which is represented by the terminal disclosed in Patent Literature 1, in a case where the user turns over the page in the above-mentioned case, the electronic book initializes the magnification display. For this reason, it has been necessary for the user to repeat, each time a page is turned over, an operation of magnifying a given part on which the user intends to focus. For example, in a case where a user reads a text on an electronic book, the user frequently wishes to read the text without changing a magnification of the text once the text is magnified at such a magnification. In a case where it is necessary for the user to conduct an operation of magnifying the text each time a page is turned over, the user feels too troublesome.

As with the terminal disclosed in Patent Literature 1, in a case where an electronic device changes a position of a part to be magnified and displayed while changing a display magnification, a problem will occur that it is difficult for a user to know which part of a page is magnified and displayed. That is, it is difficult for the user to understand, for example, that (i) the page is automatically magnified and displayed and (ii) how an entire page and a magnified part of the page are related to each other.

The present invention has been made in view of the problems, and an object of the present invention is to provide (i) a display device capable of saving a user the trouble of the operation involved in the magnifying display so as to improve convenience for a user, (ii) a method of controlling the display device, (iii) a control program, and (iv) a storage medium.

Solution to Problem

In order to attain the object, a display device of the present invention is (1) capable of displaying an electronic book containing a content across a plurality of pages, and includes:

(2) reduction means for displaying, in a case where (i) a part of the content is visually recognizable by magnifying and displaying the plurality of pages at a given magnification ratio and (ii) a user conducts an operation of turning over a page which is being displayed, an entire page to be displayed in accordance with the operation of turning over the page; and (3) magnification means for magnifying, at the given magnification ratio, a given part of the page to be displayed after the reduction means displays the entire page to be displayed.

In order to attain the object, a method of the present invention of controlling a display device is (1) a method of controlling a display device capable of displaying an electronic book containing a content across a plurality of pages, and the method includes the steps of:

(2) (A) reducing and displaying, in a case where (i) a part of the content is visually recognizable by magnifying and displaying the plurality of pages at a given magnification ratio and (ii) a user conducts an operation of turning over a page which is being displayed, an entire page to be displayed in accordance with the operation of turning over the page; and (3) (B) magnifying and displaying, at the given magnification ratio, a given part of the page to be displayed after the entire page to be displayed is displayed in the step (A).

The following description will discuss a case where a user conducts an operation of magnifying and displaying a page of an electronic book at a given magnification ratio so that a part of a content contained in the page is displayed on an entire display screen provided in the display device.

As described above, according to a conventional display device, in a case where the user conducts the operation of turning over the page in the above-mentioned case, the electronic book initializes the magnification display. For this reason, each time a page is turned over, the user has conducted an operation of magnifying a part on which the user intends to focus.

In contrast, according to the display device and the method of controlling the display device of the present invention, in a case where the user conducts the operation of turning over the page in the above-mentioned case, a given part of a page to be displayed in accordance with the operation of turning over the page (i.e., a page to be displayed next) is magnified and displayed at the magnification ratio. Accordingly, the display device and the method of controlling the display device of the present invention each allow the user to omit the operation of magnifying the given part each time a page is turned over.

Note here that, according to the display device and the method of controlling the display device of the present invention, the entire page to be displayed next is once displayed, before the given part is magnified and displayed. This allows the user to surely understand (i) that the page is automatically magnified and displayed and (ii) how the entire page and the magnified part of the page are related to each other (e.g., where the magnified part is located in the next page, what size the magnified part has in the next page, etc.).

Therefore, the display device and the method of controlling the display device of the present invention can improve convenience for the user.

Note that the display device can be implemented by a computer. In this case, (i) a control program which causes a computer to operate as each means of the display device so that the display device is implemented by the computer and (ii) a computer-readable storage medium in which the program is stored are also encompassed in the scope of the present invention.

Advantageous Effects of Invention

As described above, a display device of the present invention includes: reduction means for displaying, in a case where (i) a part of the content is visually recognizable by magnifying and displaying the plurality of pages at a given magnification ratio and (ii) a user conducts an operation of turning over a page which is being displayed, an entire page to be displayed in accordance with the operation of turning over the page; and magnification means for magnifying, at the given magnification ratio, a given part of the page to be displayed after the reduction means displays the entire page to be displayed A method of controlling a display device of the present invention includes the steps of: (A) reducing and displaying, in a case where (i) a part of the content is visually recognizable by magnifying and displaying the plurality of pages at a given magnification ratio and (ii) a user conducts an operation of turning over a page which is being displayed, an entire page to be displayed in accordance with the operation of turning over the page; and (B) magnifying and displaying, at the given magnification ratio, a given part of the page to be displayed after the entire page to be displayed is displayed in the step (A).

Therefore, the display device and the method of controlling the display device of the present invention each bring about an effect of allowing a user to omit an operation of magnifying a given part each time a page of an electronic book is turned over. In addition, the display device and the method of controlling the display device of the present invention each bring about an effect of allowing the user, by displaying once an entire page before magnifying and displaying the given part, to surely understand (i) that the page is automatically magnified and displayed and (ii) how the entire page and the magnified part of the page are related to each other.

DESCRIPTION OF EMBODIMENTS

The following description will discuss an outline of an embodiment of the present invention with reference to FIGS. 1 through 8.

[Outline of Display Device 100]

Figure 1:
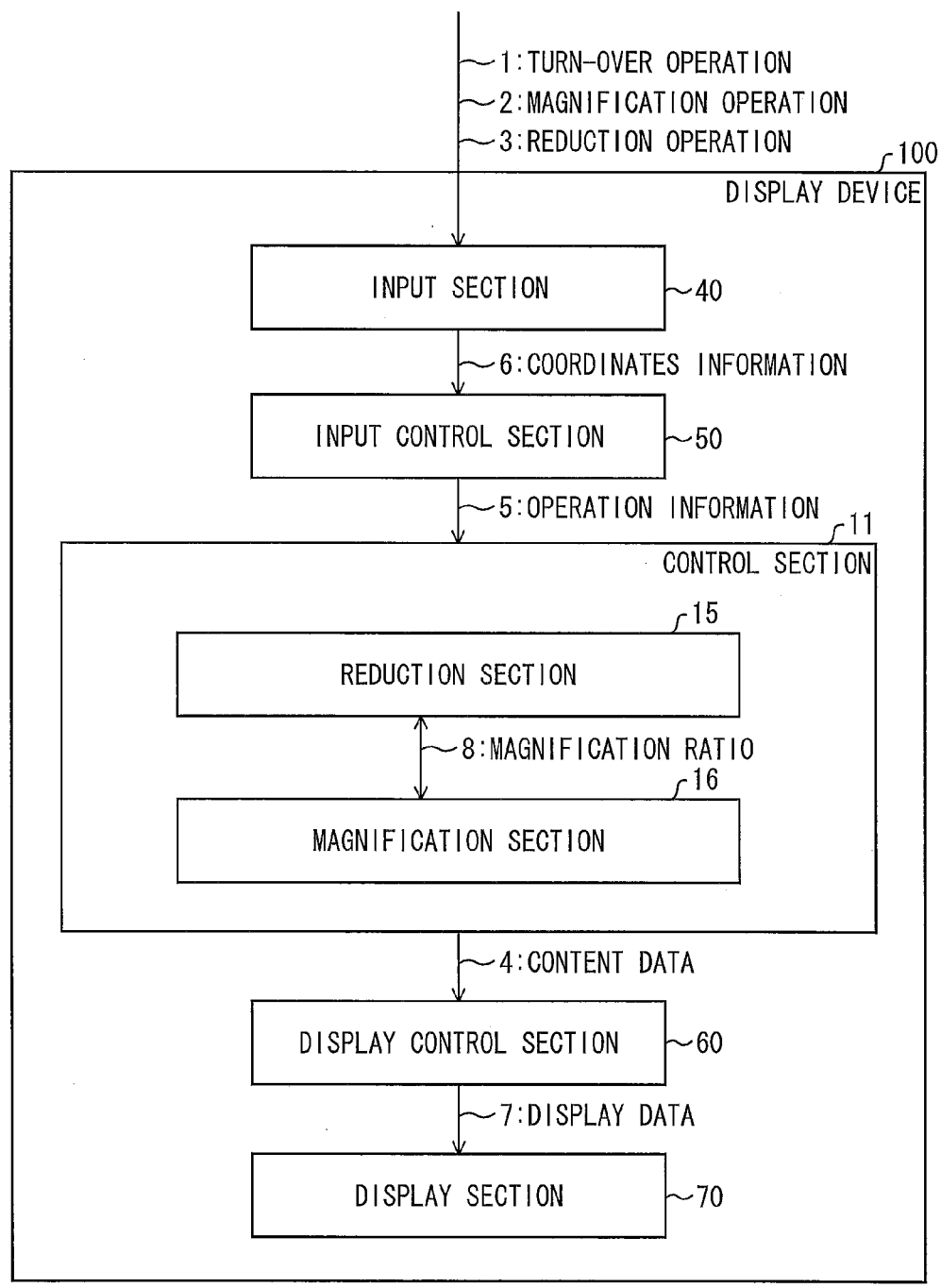
FIG. 1 is a block diagram illustrating a main part of a configuration of a display device of an embodiment of the present invention.

The following description will discuss an outline of a display device 100 of the present embodiment with reference to FIG. 1. FIG. 1 is a block diagram illustrating a main part of a configuration of the display device 100.

The display device 100 is a device capable of displaying an electronic book containing a content across a plurality of pages. Specifically, examples of the display device 100 encompass an electronic book reader, a tablet terminal, a mobile phone, a smartphone, and other devices each including a display screen having a touch panel.

The electronic book indicates electronic data containing a text, an image, a video image, music, a sound, a drawing, and other contents.

Figure 2:
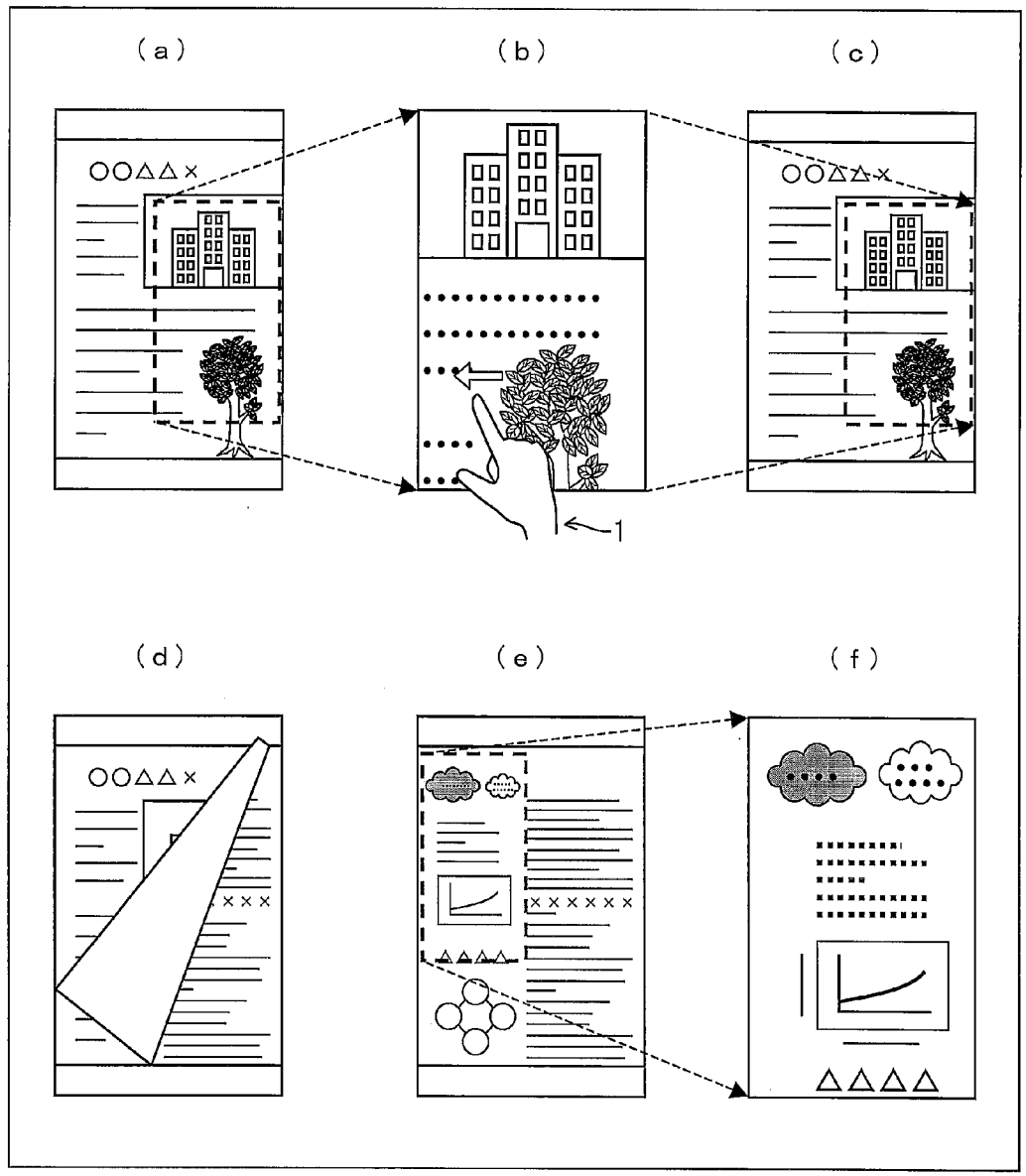
FIG. 2 is a view schematically illustrating a basic operation of the display device.
Figure 3:
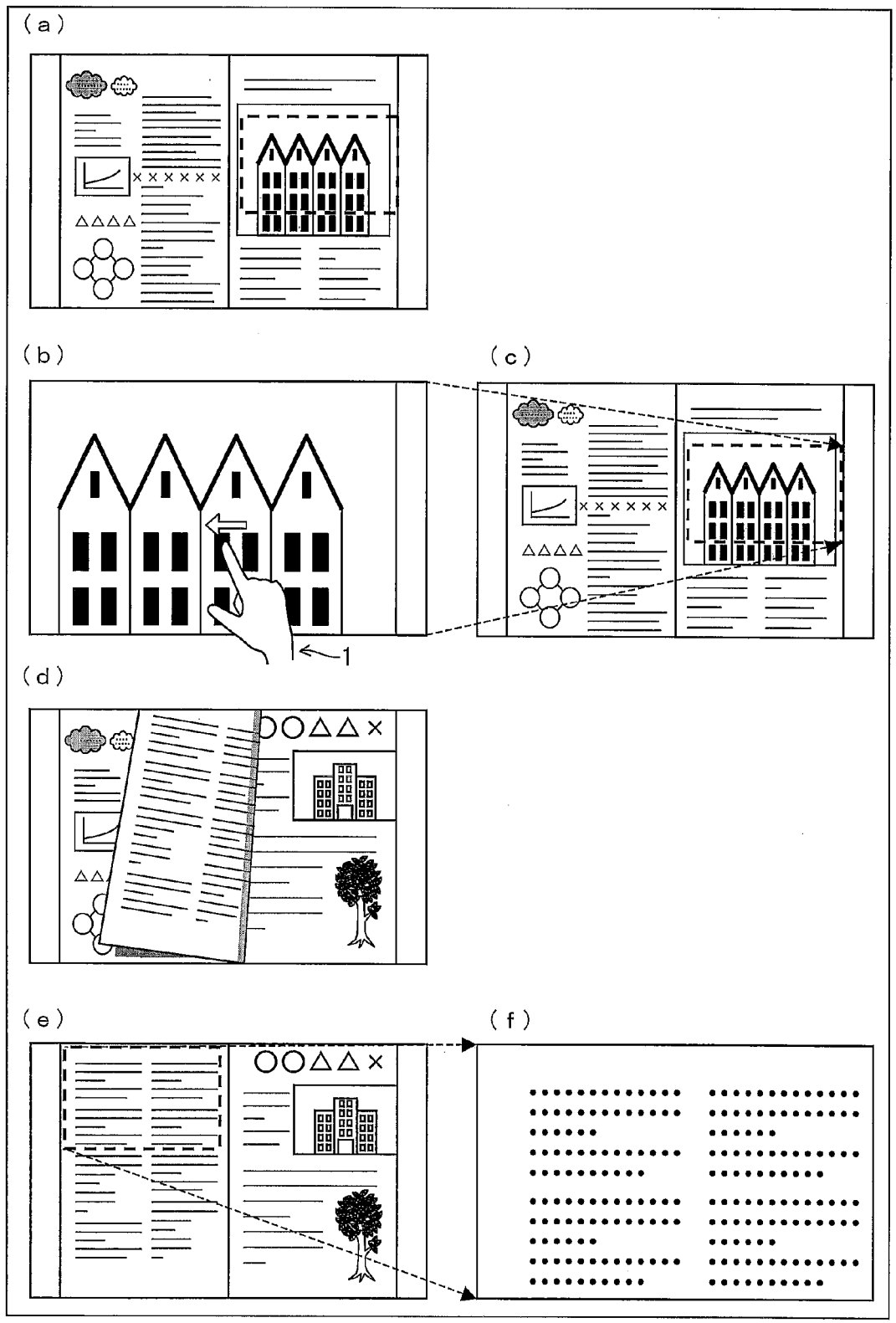
FIG. 3 is a view schematically illustrating a different basic operation of the display device.

The following description will discuss an outline of an operation of the display device 100 with reference to FIGS. 2 and 3. FIG. 2 is a view schematically illustrating a basic operation of the display device 100. (a) of FIG. 2 illustrates how, in a case where a user holds the display device 100 so that a longitudinal direction of the display device 100 is substantially vertical (hereinafter referred to as "vertical holding state"), the display device 100 reduces or magnifies and displays a content contained in a page which is being viewed (i.e., a page which is being displayed, a page on which a turn-over operation is conducted) so that a vertical width of the page matches a vertical width of a display section 70 (see FIG. 1).

(b) of FIG. 2 illustrates how the display device 100 displays, by magnifying the page at a magnification ratio 8, the page thus magnified. (c) of FIG. 2 illustrates how, in a case where the user conducts an operation of turning over a page (hereinafter referred to as "turn-over operation 1"), the page is entirely displayed. (d) of FIG. 2 illustrates how a "turn-over effect" (visual effect) is displayed in conjunction with the turn-over operation 1. (e) of FIG. 2 illustrates how a page to be displayed in accordance with the turn-over operation 1 (hereinafter referred to as "next page") is entirely displayed. (f) of FIG. 2 illustrates how, after the next page is entirely displayed, a given part of the next page is displayed by being magnified at the magnification ratio 8.

According to (a) of FIG. 2, in a case where the display device 100 reduces or magnifies and displays the content contained in the page so that a horizontal width of the page matches a horizontal width of the display section 70, blank spaces occur in respective upper and lower end parts. This state is referred to as "upper and lower blank spaces state during fitting". Similarly, in a case where the display device 100 reduces or magnifies and displays the content contained in the page so that the vertical width of the page matches the vertical width of the display section 70, blank spaces occur in respective right and left end parts. This state is referred to as "right and left blank spaces state during fitting". Note that a state, in which no blank space occur, is referred to as "complete matching state during fitting".

Note that, in each of the above states, the display device 100 magnifies or reduces the page so that the page fits in the display section 70 and is displayed in a largest size. In this case, the magnification ratio 8 is 1.0 (a fitting state).

One of the above three states is determined in accordance with an aspect ratio of the display section 70 and an aspect ratio of a page to be displayed by the display device 100 as follows:

(A) when Dh/Dw<Ih/Iw, a right and left blank spaces state during fitting:

(B) when Dh/Dw=Ih/Iw, a complete matching state during fitting: and (C) when Dh/Dw>Ih/Iw, an upper and lower blank spaces state during fitting, where Dw and Dh indicate a width and a height of the display section 70, respectively, and Iw and Ih indicate a width and a height of the page, respectively. For example, (a) of FIG. 2 illustrates an example of the state (C). Note, however, that another state ((A) or (B)) can be, depending on an aspect ratio of the display section 70 and an aspect ratio of the page.

FIG. 3 is a view schematically illustrating a different basic operation of the display device 100. (a) of FIG. 3 illustrates how, in a case where (i) a user holds the display device 100 so that the longitudinal direction of the display device 100 is substantially horizontal and (ii) a "horizontal-fit setting" (later described) is disabled (hereinafter referred to as "double truck state"), the display device 100 reduces or magnifies and displays a content contained in at least two pages arranged in a transverse direction so that the at least two pages can be entirely displayed by the display section 70. Note that the entire at least two pages arranged in a double truck state may be hereinafter simply referred to as "page".

(b) of FIG. 3 illustrates how the display device 100 magnifies and displays the page at a magnification ratio 8. (c) of FIG. 3 illustrates how, in a case where the user conducts a turn-over operation 1, the entire page is displayed. (d) of FIG. 3 illustrates how a "turn-over effect" is displayed in conjunction with the turn-over operation 1. (e) of FIG. 3 illustrates how an entire next page is displayed in accordance with the turn-over operation 1. (f) of FIG. 3 illustrates how, after the entire next page is displayed, a given part of the next page is magnified and displayed at the magnification ratio 8.

Note that each (b) of FIGS. 2 and 3 illustrates how a rectangular part which (i) is illustrated in a corresponding one of (a) and (c) of FIGS. 2 and 3 and (ii) is indicated by a dotted line (a given part of the page) is displayed in a full scale of a display region of the display section 70. Each of (f) of FIGS. 2 and 3 illustrates how a rectangular part which (i) is illustrated in a corresponding one of (e) of FIGS. 2 and 3 and (ii) is indicated by a dotted line is displayed in a full scale of a display screen of the display section 70. Note, however, that (i) the rectangular part indicated by a dotted line and (ii) arrows which indicate a correspondence relation of the rectangular part are added for convenience. As such, the display device 100 will never display the rectangular part and the arrows.

(a) of FIG. 3 indicates an example of the "right and left blank spaces state during fitting" ((A)). Note, however, that another state ((A) or (B)) can be, depending on an aspect ratio of the display section 70 and an aspect ratio of a page to be displayed.

The following description will discuss, as illustrated in (b) of FIGS. 2 and 3, a case where a user conducts an operation of magnifying and displaying, at the magnification ratio 8, a page which is being viewed so that a part of a content contained in the page is visually recognizable (see (a) and (b) of each of FIGS. 2 and 3).

In this case, when the user conducts the turn-over operation 1 ((b) of FIGS. 2 and 3), the display device 100 carries out processing in accordance with the following four steps. Specifically, the display device 100

(1) displays the entire page which is being viewed ((c) of FIGS. 2 and 3), (2) displays, in conjunction with the turn-over operation 1, the "turn-over effect" by which the page is turned over as if the page in paper could actually be turned over ((d) of FIGS. 2 and 3), (3) displays the entire next page ((e) of FIGS. 2 and 3, a reduction step), and (4) magnifies and displays the given part of the next page at the magnification ratio 8 ((f) of FIGS. 2 and 3, a magnification step).

Note here that in the step (4), the display device 100 will magnify and display the given part of the next page at the magnification ratio 8 which is identical to the magnification ratio 8 at which a current page, which is being viewed, is magnified and displayed. That is, the display device 100 also employs, when the next page is displayed, the magnification ratio 8 of the current page which is being viewed. This allows the user to save his/her the trouble of setting again the magnification ratio each time a page is turned over.

Note, however, that the display device 100 once displays the entire next page, before the given part of the next page is magnified and displayed (in step (3)). This allows the user to surely understand (i) that the next page is magnified and displayed and (ii) how the entire next page and the magnified part of the next page are related to each other (e.g., where the magnified part is located in the next page, what size the magnified part has in the next page, etc.).

Note that, in a case where the display device 100 magnifies the next page, an effect can be displayed which carries out an interpolation with reference to the display carried out before the magnification and the display carried out after the magnification. The display device 100 can initialize the magnification ratio 8, in a case where the user changes how to hold the display device 100 and consequently the display device 100 changes how to display the page.

Figure 4:
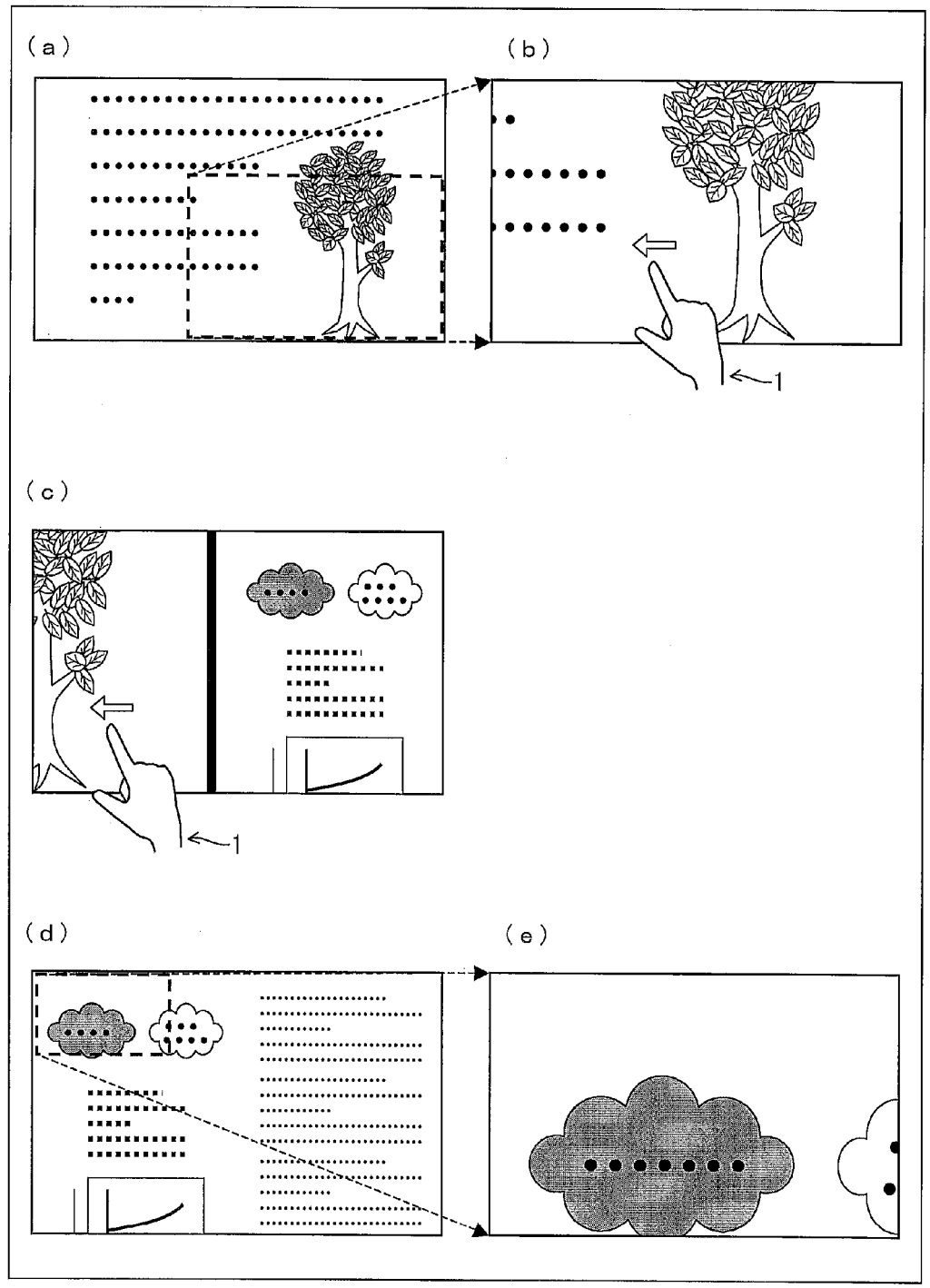
FIG. 4 is a view schematically illustrating a further different basic operation of the display device.

The following description will further discuss the outline of the operation of the display device 100 with reference to FIG. 4. FIG. 4 is a view schematically illustrating a further different basic operation of the display device 100. (a) of FIG. 4 illustrates how, in a case where (i) a user holds the display device 100 so that the longitudinal direction of the display device 100 is substantially horizontal and (ii) the "horizontal-fit setting" (later described) is enabled (hereinafter referred to as "horizontal holding state"), the display device 100 reduces or magnifies and displays a content contained in a page which is being viewed so that a horizontal width of the page matches a horizontal width of the display section 70 (hereinafter, this displaying state is referred to as "horizontal fitting state"). In this state, a magnification ratio 8 is 1.0 (a fitting state).

Note that the "horizontal-fit setting" indicates a setting which is carried out, with respect to the display device 100, so as to switch between horizontal holding and double truck holding. Note, however, that the display device 100 can initialize the magnification ratio 8 in accordance with the switching between enabling and disabling of the horizontal-fit setting.

(b) of FIG. 4 illustrates how the display device 100 magnifies and displays the page at a magnification ratio 8. (c) of FIG. 4 illustrates how a "card effect" (visual effect) is displayed in conjunction with the turn-over operation 1. (d) of FIG. 4 illustrates how an entire next page is displayed in accordance with the turn-over operation 1. (e) of FIG. 4 illustrates how a given part of the next page is magnified and displayed at the magnification ratio 8 after the entire next page is displayed.

FIGS. 2 and 3 differ from FIG. 4 in that (i) the operation illustrated in FIG. 4 includes no step (1) and (ii) the effects displayed in respective steps (2) are different. Specifically, in a case where (a) the current page which is being viewed is displayed in the horizontal fitting state and (b) the user conducts the turn-over operation 1, the current page and the next page are horizontally moves while sliding without displaying the entire page. This causes the next page to be displayed while displaying the "card effect," by which it is visually recognized that the current page and the next page are replaced with each other.

Figure 5:
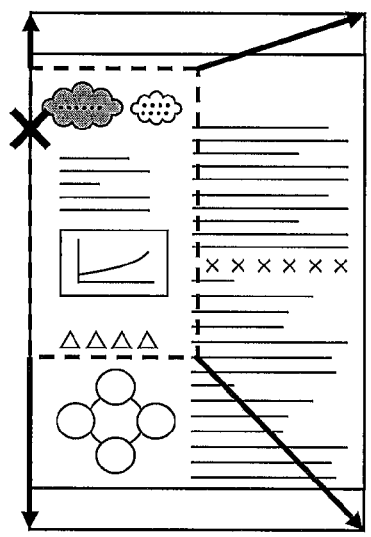
FIG. 5 is a view schematically illustrating how to determine origin of coordinates in a case where the display device magnifies a next page. (a) of FIG. 5 illustrates magnifying origin of coordinates determined in a case where the next page is displayed in an upper and lower blank spaces state during fitting. (b) of FIG. 5 illustrates magnifying origin of coordinates determined in a case where the next page is displayed in a right and left blank spaces state during fitting.
Figure 5:
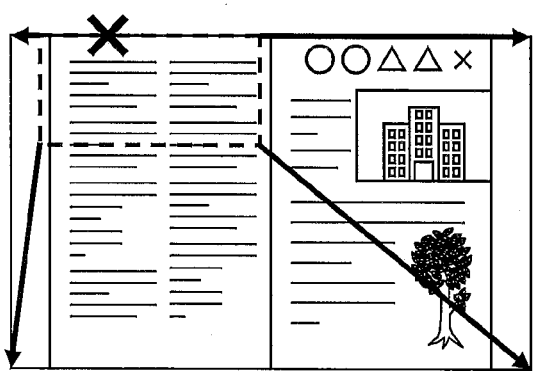

The following description will further discuss the outline of the operation of the display device 100 with reference to FIG. 5. FIG. 5 is a view schematically illustrating how to determine origin of coordinates in a case where the display device 100 magnifies a next page. (a) of FIG. 5 illustrates magnifying origin of coordinates determined in a case where the next page is displayed in the upper and lower blank spaces state during fitting. (b) of FIG. 5 illustrates magnifying origin of coordinates determined in a case where the next page is displayed in the right and left blank spaces state during fitting.

The "origin of coordinates" or "magnifying origin of coordinates" indicates coordinates of a point at which display coordinates do not change during magnification. In the step (4), the display device 100 magnifies around given origin of coordinates and displays the next page. Note that, in the "complete matching state during fitting", the display device 100 has origin of coordinates at upper left (coordinates indicated by "x" mark) illustrated in (a) of FIG. 5.

According to each of (a) and (b) of FIG. 5, the origin of coordinates is indicated by "x" mark. Note, however, that such a mark is added for convenience. As such, the display device 100 will never display the mark. The same applies to a rectangle indicated by a dotted line and arrows.

Figure 6:
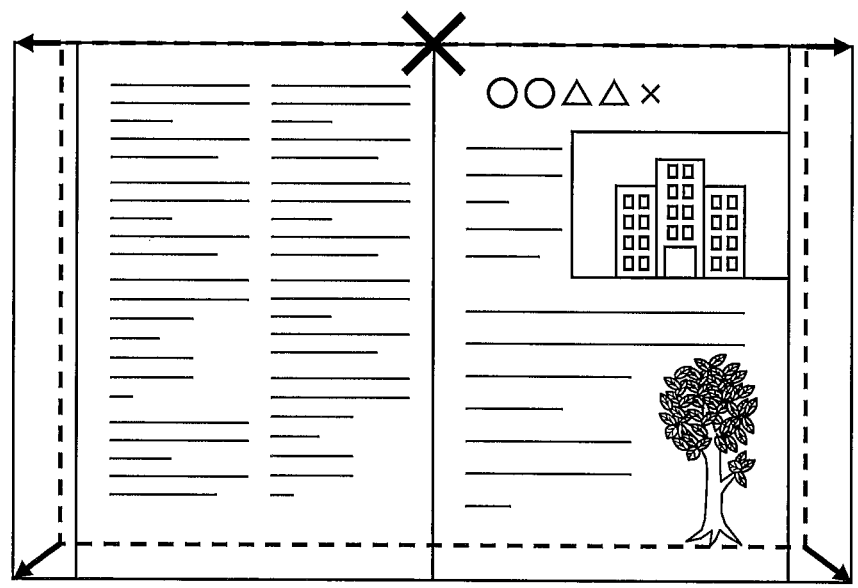
FIG. 6 is a view schematically illustrating how, in a case where a horizontal width of a page which is magnified at a given magnification ratio is smaller than a horizontal width of a display section and consequently blank spaces having identical widths occur in respective right and left end parts of the display section while the page is being displayed, the display device carries out a magnification, in accordance with the widths of the respective blank spaces, around a center of the display section which center is origin of coordinates.

The following description will further discuss the outline of the operation of the display device 100 with reference to FIG. 6. FIG. 6 is a view schematically illustrating how, in a case where a horizontal width of a page which is magnified at a magnification ratio 8 is smaller than the horizontal width of the display section 70 and consequently blank spaces having identical widths occur in the respective right and left end parts of the display section 70 while the page is being displayed, the display device 100 carries out a magnification, in accordance with the widths of the respective blank spaces, around a center of the display section 70 which center is origin of coordinates. Note that the "center of the display section 70" indicates (i) a position which is substantially a midpoint in the transverse direction of the display section 70 and (ii) any position in the longitudinal direction (e.g., a position which is located on and is a midpoint of an upper end part of the page). In this case, the display device 100 magnifies and displays the page so as to fill in each of the blank spaces which have identical widths and have occurred in the respective right and left end parts of the display section 70.

The reason why the center of the display section 70 is determined to be the origin of coordinates is that positions, where to display while each displaying an effect, should match each other before and after the magnification. Specifically, in a case where (i) a user conducts the turn-over operation 1 and consequently the display device 100 magnifies a next page at the magnification ratio 8, (ii) even after the page is magnified, blank spaces having identical widths occur in the respective right and left end parts (in this case, blank spaces having identical widths also exist in the respective right and left end parts before the magnification), and (iii) the page is magnified around, for example, upper left of the display section 70, positions, where to display while each displaying an effect of interpolating with reference to the display carried out before the magnification and the display carried out after the magnification, do not match each other before and after the magnification. The display device 100 can prevent such a problem by carrying out a magnification around the center of the display section 70 which center is the origin of coordinates.

Note that, in a case where blank spaces having identical widths occur in the respective upper and lower end parts of the display section 70 while the page is being displayed, the display device 100 can carry out a magnification, in accordance with the widths of the respective blank spaces, around the center of the display section 70 which center is origin of coordinates. Note that, in this case, the "center of the display section 70" indicates (i) a position which is substantially a midpoint in the longitudinal direction of the display section 70 and (ii) any position in the transverse direction (e.g., a position which is located on and is a midpoint of a left end part of the page). In this case, the display device 100 magnifies and displays the page so as to fill in each of the blank spaces which have identical widths and have occurred in the respective upper and lower end parts of the display section 70.

[Configuration of Display Device 100]

The following description will discuss a configuration of the display device 100 of the present embodiment with reference to FIG. 1. The display device 100 includes an input section 40, an input control section 50, a control section 11, a display control section 60, and a display section 70.

Note that, for simplification, sections, which are not directly relevant to the present embodiment (e.g., a section which realizes an Internet connection, a sound output, or the like), are omitted from the description of the configuration and the block diagram. Note, however, that the display device 100 of the present embodiment can include the omitted configuration in accordance with actual conditions of implementation.

The following description will discuss each function of the input section 40, the input control section 50, the control section 11 (a reduction section 15, a magnification section 16), the display control section 60, and the display section 70, in this order.

The input section 40 accepts a turn-over operation 1, a magnification operation 2, and a reduction operation 3, each of which is conducted by a user. The present embodiment mainly assumes a touch panel capable of detecting a multi-touch. Note, however, that a type of hardware is not limited to a specific one, provided that the input section 40 includes an input surface via which the user can enter information by conducting the operations described above. The input section 40 supplies, to the input control section 50, two-dimensional coordinates information 6, on the input surface, regarding a finger(s) of the user or an instructing tool such as stylus which finger(s) or instructing tool touches on the input surface.

The input control section 50 generates operation information 5 in accordance with the operation which is conducted by the user with respect to the input surface of the input section 40. For example, the input control section 50 obtains the coordinates information 6 from the input section 40 at certain time intervals, and then analyzes a series of the coordinates data so as to identify an operation which the user intends. The input control section 50 then generates operation information 5 corresponding to the operation. The input control section 50 supplies the operation information 5 thus generated to the control section 11.

The control section 11 comprehensively controls various functions of the display device 100. The control section 11 includes a reduction section (reduction means, switching means) 15 and a magnification section (magnification means) 16. The control section 11 detects the operation information 5 supplied from the input control section 50 and then supplies the operation information 5 thus detected to the reduction section 15 or the magnification section 16.

The reduction section 15 displays an entire next page in a case where (i) a part of a content contained in a page is visually recognizable by magnifying and displaying the page at a magnification ratio 8 and (ii) the user conducts the turn-over operation 1. Specifically, in a case where the reduction section 15 determines whether or not the display device 100 is in the horizontal holding state and determines that the display device 100 is not in the horizontal holding state, the reduction section 15 supplies, to the display control section 60, content data 4 corresponding to the entire next page. Note that the reduction section 15 can display a page in one of the following display states: the right and left blank spaces state during fitting, the upper and lower blank spaces state during fitting, the complete matching state during fitting, and the horizontal fitting state.

In a case where the user conducts the turn-over operation 1, the reduction section 15 displays a visual effect in conjunction with the turn-over operation 1 before displaying the entire next page. The reduction section 15 further supplies, to the magnification section 16, a magnification ratio 8 of a page which is being viewed by the user (i.e., a page displayed before the user conducts the turn-over operation 1).

Note that, in a case where the user conducts the turn-over operation 1, the reduction section 15 can store, in a storage device (later described), the magnification ratio 8 applied to a page which is being viewed. Alternatively, the reduction section 15 can store the magnification ratio in the storage device at the time when the user has conducted an operation of magnifying the page which is being viewed by the user (in step 3 (later described with reference to FIG. 8)).

The magnification section 16 magnifies a given part of the page at the magnification ratio 8 in accordance with the operation information 5 provided by the user. Specifically, the magnification section 16 supplies, to the display control section 60, content data 4 corresponding to the given part of the page in accordance with (i) the magnification ratio 8 which is specified by the operation information 5 and (ii) origin of coordinates.

Even in a case where no operation of magnifying display is conducted by the user, when the entire next page is displayed by the reduction section 15, the magnification section 16 magnifies a given part of the next page at the magnification ratio 8. In this case, the magnification section 16 supplies, to the display control section 60, the content data 4 corresponding to the given part of the page, in accordance with the magnification ratio 8 specified by the operation information 5 (i.e., the magnification ratio 8 identical to the magnification ratio 8 at which the page, that is being viewed, has been magnified and displayed) and origin of coordinates obtained from a given calculation.

Note that the magnification section 16 can initialize the magnification ratio 8 in a case where the reduction section 15 changes how to display the page. Such initialization of the magnification ratio indicates setting the magnification ratio to 1.0 time (i.e., display with no magnification).

Note that, the magnification section 16 can initialize the magnification ratio 8 in a case where the user changes how to hold the display device 100 and consequently the reduction section 15 changes how to display the page. Such initialization of the magnification ratio indicates setting the magnification ratio 8 to 1.0 time (i.e., display with no modification) in the right and left blank spaces state during fitting, the upper and lower blank spaces state during fitting, the complete matching state during fitting, or the horizontal fitting state in each of the vertical holding state, the double truck state, and the horizontal holding state.

The display control section 60 supplies a page to the display section 70. The display control section 60 can convert information, supplied from the control section 11 (e.g., content data 4), into display data 7 which is in conformity with a format which can be displayed by the display section 70. Examples of the display data 7 encompass an image which is in conformity with a bitmap format, an image which is in conformity with another format, and an image which is in conformity with data format suitable for display. Note that the display control section 60 is not limited to a specific one, provided that it includes a section which can make a format conversion of the information into the display data 7. Examples of the display control section 60 encompass a general display adaptor.

The display section 70 is a device which displays a video image etc. The present embodiment mainly assumes a Liquid Crystal Display (LCD). Note, however, that display section 70 is not limited to a specific one, provided that it has a display function (particularly, a flat panel display). A type of hardware is not limited to a specific one. Examples of the display section 70 encompass a device including (i) a display element such as a Plasma Display Panel (PDP) or an EL (Electroluminescence) display and (ii) a driver circuit which drives the display element in accordance with the display data 7 supplied from the display control section 60.

According to FIG. 1, in order to clearly specify a function of each component, the input section 40 and the display section 70 are separately illustrated. Note, however, that, in a case where, for example, the input section 40 is a touch panel and the display section 70 is a liquid crystal display, it is preferable that the input section 40 and the display section 70 be integral with each other. Specifically, the input section 40 and the display section 70 can be configured so that (i) the input section 40 includes a data input surface which is made of a transparent transmitting member such as glass and has a rectangular plate shape and (ii) the input section 40 is integrally provided so as to cover a data display surface of the display section 70.

The display device 100 can further include a storage device which stores data of an electronic book etc. although the storage device is not illustrated in FIG. 1. Examples of the storage device encompass nonvolatile storage devices such as a hard disk, a semiconductor memory, and a DVD (Digital Versatile Disk). Note that the storage device can be included in the display device 100 or can be an external storage device which is connected to an outside of the display device 100 so as to communicate with the display device 100.

[Operation with Respect to Display Device 100]

(Example of Possible Operation)

Examples of operations, which are conducted by a user with respect to the input surface of the input section 40, encompass a pinch-in (an operation of expanding two fingers touched on the input surface), a pinch-out (an operation of closing two fingers touched on the input surface), a drag or a flick (an operation of moving at least one finger in a direction while touching the at least one finger on the input surface), a single tap (an operation of tapping once the input surface with at least one finger), and a double tap (an operation of tapping twice the input surface with at least one finger).

According to the display device 100, the pinch-in, the pinch-out, and the drag or the flick correspond to the magnification operation 2, the reduction operation 3, and the turn-over operation 1, respectively. Note, however, that this correspondence is illustrative only, and therefore another correspondence is also possible.

Note that, in a case where a user conducts an operation of magnifying a page by the pinch-in, the display device 100 magnifies the page around a center of two positions at which the user has first touched on the input surface with the two fingers which are got lined up (i.e., positions at which the operation of expanding the two fingers were started), which center is origin of coordinates.

(Switching of Magnification Ratio by Double Tap)

Figure 7:
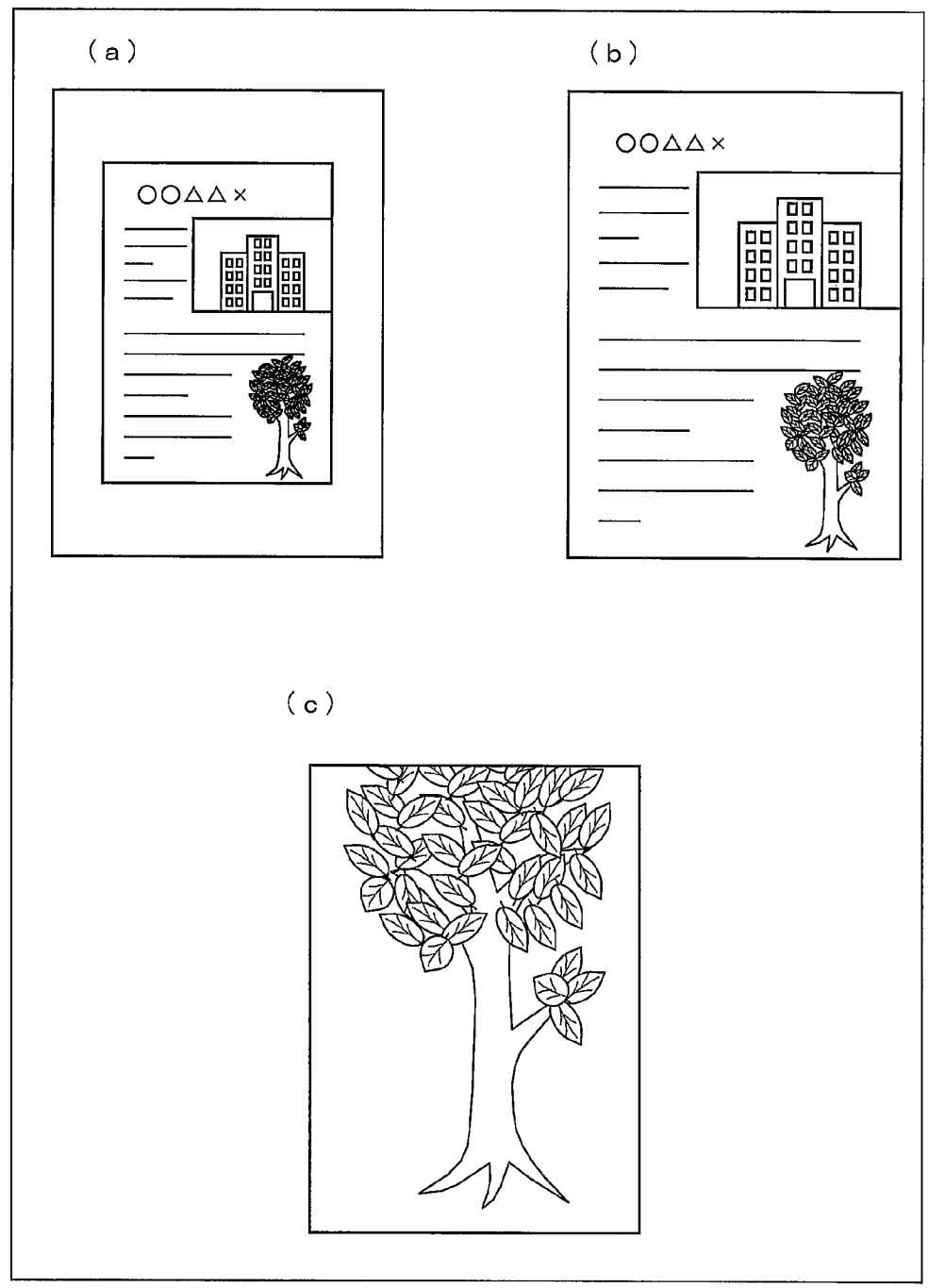
FIG. 7 is a view schematically illustrating how a magnification ratio changes in three steps when a user carries out a double tap on an input surface. (a) of FIG. 7 illustrates a state in which a page is displayed at a magnification ratio of 100%. (b) of FIG. 7 illustrates a state in which the page is displayed at a magnification ratio of 200%. (c) of FIG. 7 illustrates a state in which the page is displayed at a magnification ratio of 400%.

The following description will discuss, with reference to FIG. 7, (i) an operation conducted with respect to the display device 100 and (ii) an operation of the display device 100 at that time. FIG. 7 is a view schematically illustrating how a magnification ratio changes in three steps when a user carries out a double tap on the input surface. (a) of FIG. 7 illustrates a state in which a page is displayed at a magnification ratio of 100%. (b) of FIG. 7 illustrates a state in which the page is displayed at a magnification ratio of 200%. (c) of FIG. 7 illustrates a state in which the page is displayed at a magnification ratio of 400%.

Note that each time the user carries out a double tap on the input surface, the states illustrated in (a) through (c) of FIG. 7 are cyclically switched. Note also that the magnification ratios of 200% and 400% are illustrative only, and another magnification ratio is therefore possible.

(Details of Turn-Over Operation 1 by Drag or Flick)

In a case where (i) a part of a page which part is displayed by the display section 70 is not an end part of the page (e.g., in a case where right and left end parts of the display section 70 are not end parts of the page because a center of the page is magnified and displayed) and (ii) a user carries out a drag or a flick, a displayed part of the page changes (moves).

In contrast, in a case where (i) the end part of the page is displayed by the display section 70 and (ii) the user carries out a drag or a flick in a direction of the end part of the page, a next page is displayed. That is, as has been described above, the drag or the flick carried out at the end part of the page serves as the turn-over operation 1.

In this case, after displaying a "bound effect" (visual effect) by which the page is displayed at the end part of the display section 70 so as to go to and from the end part of the display section 70 as if the page were bounded, the display device 100 displays the entire page (current page fitting display). After displaying a "turn-over effect" in conjunction with the turn-over operation 1, the display device 100 displays the entire next page and magnifies a given part of the next page at a magnification ratio 8.

Note that the turn-over operation 1 can be also conducted by pressing a given hardware key (not illustrated in FIG. 1) included in the display device 100. In this case, the display device 100 can immediately display the next page instead of displaying the bound effect and changing the displayed part of the page.

All the effects described above can be arbitrarily set by a user. For example, the use can set (i) whether or not to display the "turn-over effect", (ii) a speed at which the page is turned over by the "turn-over effect", and/or (iii) a gap between pages in the "card effect".

(Other Functions of Display Device 100)

The display device 100 can carry out thumbnail view with respect to a content (e.g., an image) contained in an electronic book. In a case where a user (i) taps the electronic book which is thumbnail-viewed and (ii) selects a desired page via a given interface, it is possible to immediately display the page (in accordance with a horizontal-fit setting) in the right and left blank spaces state during fitting, the upper and lower blank spaces state during fitting, the complete matching state during fitting, or the horizontal fitting state. In this case, the display device 100 can display the page while displaying a "jump effect" (a visual effect by which the page is displayed while fading out the thumbnail view and fading in the page).

In a case where the thumbnail is being displayed and the user presses a given key (e.g., a back key) so that a given content contained in the electronic book is displayed, the display device 100 can employ (retain) the magnification ratio 8 which has been used before.

The display device 100 contains various types of built-in dictionary data (e.g., an English-Japanese dictionary, a Japanese-English dictionary, and a Japanese dictionary). This makes it possible to search the dictionary data, in terms of text data contained in the electronic dictionary. For example, in a case where (i) the user search the dictionary data, in terms of an arbitral word (text data) and (ii) the display device 100 displays a search result, the display device 100 can retain the magnification ratio 8. Note, however, that, for example, in a case where (a) a website is searched and then (b) the electronic book is displayed, it is possible to initialize the magnification ratio 8.

[Method of Determining Magnifying Origin of Coordinates]

As described above, in a case where a user (i) conducts an operation of magnifying and displaying, at a magnification ratio 8, a page which is being viewed so that a part of a content contained in the page is visually recognizable and (ii) conducts a turn-over operation 1, the display device 100 magnifies and displays a next page around given origin of coordinates. Such given origin of coordinates can be determined in accordance with, for example, (a) a binding direction of an electronic book (right binding or left binding) and (b) a direction in which the user conducts the turn-over operation 1.

Specifically, in a case where the user turns over, in a left direction, a page of an electronic book which is left-bound (i.e., in a case where the user turns over a page of the electronic book in a reading direction), the display device 100 can magnify and display the page around origin of coordinates located at upper left on the screen. The "upper left on the screen" indicates a point in a region, located at the upper left which is obtained in a case where the display region of the display section 70 is divided into two equal sections in a vertical direction and is divided into two equal sections in a horizontal direction so as to be divided into four equal sections.

In a case where the user turns over, in a right direction, a page of an electronic book which is left-bound (i.e., in a case where the user turns over a page of the electronic book in a returning direction), the display device 100 can magnify and display the page around origin of coordinates located at upper right on the screen. The "upper right on the screen" indicates a point in a region located at the upper right which is obtained in a case where the display region of the display section 70 is divided into two equal sections in a vertical direction and is divided into two equal sections in a horizontal direction so as to be divided into four equal sections.

Alternatively, the display device 100 can magnify and display a page around origin of coordinates obtained by a given calculation. In this case, for example, the origin of coordinates is calculated in accordance with the following equations.

(In a Case where Origin of Coordinates is Located at an Upper Left Corner of the Screen)

(i) State Other than Horizontal Fitting State

ZoomOrg.$x$=FitImage.left+FitImage.left/(rate−1);

ZoomOrg.$y$=FitImage.top+FitImage.top/(rate−1);  [Math. 1]

(ii) Horizontal Fitting State

ZoomOrg.$x$=0;

ZoomOrg.$y$=0;  [Math. 2]

(In a Case where Origin of Coordinates is Located at an Upper Right Corner of the Screen)

(i) State Other than Horizontal Fitting State

ZoomOrg.$x$=FitImage.right−(dispWidth−FitImage.right)/(rate−1);

ZoomOrg.$y$=FitImage.top+FitImage.top/(rate−1);  [Math. 3]

(ii) Horizontal Fitting State

ZoomOrg.$x$=dispWidth;

ZoomOrg.$y$=0;  [Math. 4]

(In a Case where a Width of the Page which has been Subjected to Magnification is Smaller than a Width of the Screen)

ZoomOrg.$x$=dispWidth/2;

ZoomOrg.$y$=0;  [Math. 5]

Note that (i) ZoomOrg.x and ZoomOrg.y indicate an x coordinate and a y coordinate of the origin of coordinates, respectively, (ii) FitImage.left, FitImage.top, and FitImage.right indicate a left coordinate, an upper coordinate, and a right coordinate of the display region on the screen in a fitting state, respectively, (iii) dispWidth and rate indicate a width of the display section and a magnification ratio, respectively. Note also that, in a case where the rate is 1, no magnification is carried out.

[Processing Carried Out by Display Device 100]

Figure 8:
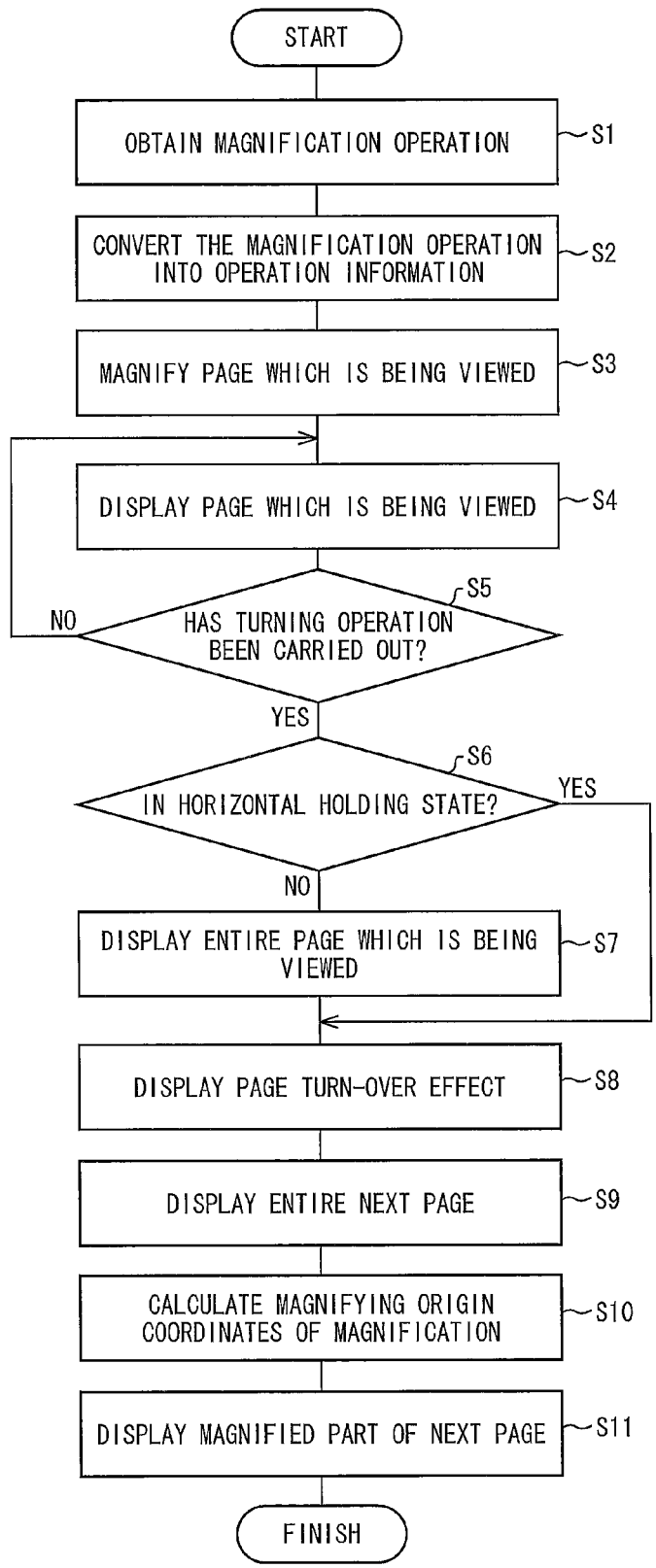
FIG. 8 is a flow chart illustrating an example of processing which is carried out by the display device.

With reference to FIG. 8, the following description will discuss a processing flow carried out by the display device 100. FIG. 8 is a flow chart illustrating an example of processing carried out by the display device 100. Note that it is assumed that, at the start of the flow chart illustrated in FIG. 8, a page of an electronic book is displayed by the display section 70 in a given displaying state (the right and left blank spaces state during fitting, the upper and lower blank spaces state during fitting, the complete matching state during fitting, or the horizontal fitting state) and the user is viewing the page.

First, the input section 40 accepts a magnification operation 2 (Step 1: hereinafter abbreviated as S1 etc.) and supplies, to the input control section 50, two-dimensional coordinates information 6 on an input surface on which the magnification operation 2 has been conducted. The input control section 50 (i) generates operation information 5 in accordance with the operation which is conducted by the user with respect to the input surface of the input section 40 (S2) and (ii) supplies the operation information 5 thus generated to the control section 11.

In accordance with (i) a magnification ratio 8 specified by the operation information 5 and (ii) magnifying origin of coordinates, the magnification section 16 supplies, to the display control section 60, content data 4 corresponding to a given part of the page which is being viewed by the user, so as to magnify the page which is being viewed (S3). Note that such a magnification ratio 8 is a magnification ratio 8 which is updated by determining a next magnification ratio 8 based on a magnification ratio specified by a current magnification ratio 8 and the operation information 5. The display control section 60 converts the content data 4 into display data 7 and supplies the display data 7 to the display section 70 so as to display the given part of the page which is being viewed by the user (S4).

Thereafter, the control section 11 awaits the operation information 5 corresponding to the turn-over operation 1 from the input control section 50 (S5). In a case where the control section 11 detects the turn-over operation 1 (YES in S5), the reduction section 15 determines whether or not the display device 100 is in the horizontal holding state (S6). In a case where it is determined that the display device 100 is not in the horizontal holding state (NO in S6), the reduction section 15 supplies, to the display control section 60, content data 4 corresponding to an entire page so that, as with the above-mentioned case, the entire page is displayed (S7). Note that, in a case where it is determined that the page is displayed in the horizontal fitting state (YES in S6), the reduction section 15 carries out processing in S8 without carrying out the processing in S7.

Thereafter, the reduction section 15 displays a given visual effect which is in conjunction with the turn-over of the page (S8). According to S8 illustrated in FIG. 8, the reduction section 15 displays, for example, the "turn-over effect" illustrated in (d) of FIG. 2. The reduction section 15 supplies, to the display control section 60, content data 4 corresponding to an entire next page, so that, as with the above-mentioned case, the entire next page is displayed (S9, a reduction step). The reduction section 15 then supplies, to the magnification section 16, a magnification ratio 8 of a page which is being viewed by the user (the page displayed before the turn-over operation 1 is conducted).

The magnification section 16 calculates magnifying origin of coordinates in accordance with a given calculation (S10). In accordance with the magnification ratio 8 supplied from the reduction section 15, the magnification section 16 supplies, to the display control section 60, content data 4 corresponding to a given part of the next page so that the next page is magnified around the magnifying origin of coordinates and displayed as with the above-mentioned case (S11, a magnification step).

[Effects Brought about by Display Device 100]

The display device 100 brings about an effect of allowing a user to omit an operation required involved in magnifying display, thereby improving convenience for the user. In other words, the display device 100 brings about an effect of allowing a user to omit an operation of magnifying a given part each time a page of an electronic book is turned over.

By displaying once an entire page before magnifying and displaying the given part, the display device 100 further brings about an effect of allowing the user to surely understand (i) that the page is automatically magnified and displayed and (ii) how the entire page and the magnified part of the page are related to each other.

Combination of Configurations (Technical Means) of Embodiments

Note that the configurations of the embodiments above can be combined as appropriate. That is, all of the configurations described in the embodiments can be used so as to be combined in their entirety or in part, not only in the embodiment described above alone, but also in another embodiment. An embodiment derived from the combination is also encompassed in the technical scope of the present invention.

In other words, the present invention is not limited to the description of the embodiment above, but may be altered by a skilled person in the art within the scope of the claims. An embodiment derived from a proper combination of technical means disclosed in different embodiments is also encompassed in the technical scope of the present invention.

Software Implementation Example

Finally, each block of the display device 100 (particularly, the control section 11) can be implemented by hardware such as a logic circuit provided in an integrated circuit (IC chip) or can be implemented by software with the use of a CPU (Central Processing Unit).

In the latter case, the display device 100 includes a CPU that executes an instruction of a program that realizes respective functions; a ROM (Read Only Memory) that stores the program, a RAM (Random Access Memory) in which the program is loaded, and a storage device (storage medium) such as a memory that stores the program and various kinds of data. The object of the present invention can be also attained by supplying, to the display device 100, a storage medium, in which a program code (execute form program, intermediate code program, source program) for a control program, i.e., software that realizes the above-mentioned functions, of the display device 100, is stored readably by a computer, and by reading and executing the program code stored in the storage medium by the computer (or CPU or MPU).

The storage medium may use any of tapes, such as a magnetic tape and a cassette tape; any of disks including magnetic disks, such as a Floppy (registered trademark) disk and a hard disk, and optical disks, such as a CD-ROM, an MO, an MD, a DVD, and a CD-R; any of cards, such as an IC card (including a memory card) and an optical card; any of semiconductor memories, such as a mask ROM, an EPROM, an EEPROM (registered trademark), and a flash ROM; or any of logic circuits, such as a PLD (Programmable Logic Device) and a FPGA (Field Programmable Gate Array).

The display device 100 may be arranged to be connectable to a communication network, and the program code may be supplied via the communication network. This communication network is not particularly limited as long as the communication network can transmit the program code. For example, the Internet, an intranet, an extranet, a LAN, an ISDN, a VAN, a CATV communication network, a virtual private network, a telephone line network, a mobile communication network, or a satellite communication network may be used. A transmission medium forming the communication network is only required to transmit the program code, and hence is not limited to a specific configuration or a specific type. For example, the transmission medium may be a wired configuration, such as IEEE1394, a USB, a power-line carrier, a cable TV line, a telephone line, or ADSL (Asymmetric Digital Subscriber Line) line; or a wireless configuration, such as an infrared ray (e.g., IrDA or remote control), Bluetooth (registered trademark), IEEE802.11 radio, HDR (High Data Rate), NFC (Near Field Communication), DLNA (Digital Living Network Alliance), a mobile phone network, a satellite line, or a terrestrial digital network. The present invention may be implemented in a form of a computer data signal which is embedded in a carrier wave and in which the program code is implemented by electronic transmission.

As described above, according to the present specification, means does not always indicate physical means, and therefore examples of such means encompass a case where a function of each means is implemented by software. A function of a single means can be carried out by two or more physical means. Alternatively, functions of two or more means can be realized by one physical means.

The display device of the present invention is configured such that (1) in a case where the user conducts the operation of turning over the page, the reduction means displays an entire page which is being displayed and on which the operation of turning over the page has been conducted by the user, before displaying the entire page to be displayed in accordance with the operation of turning over the page.

With the configuration, in a case where the user conducts the operation of turning over the page, after displaying the entire page (the page which is being viewed by the user), the display device of the present invention can display the entire page to be displayed in accordance with the operation of turning over the page (the page to be displayed next).

This allows the user to understand that the page which is being viewed by the user has been magnified and displayed, thereby allowing the user to more surely understand that the page to be displayed next will be also magnified and displayed. Therefore, the display device of the present invention can further improve convenience for the user.

The display device of the present invention further includes:

(1) switching means for switching between (i) the reduction means displaying and (ii) the reduction means not displaying the entire page which is being displayed and on which the operation of turning over the page has been conducted.

With the configuration, the display device of the present invention can switch between (i) displaying and (ii) not displaying the entire page which is being viewed by the user, before displaying the entire page to be displayed next. For example, the switching means can carry out the switching in accordance with a state, a condition, or the like in each of which the electronic book is viewed by user. Therefore, the display device of the present invention can further improve convenience for the user.

The display device of the present invention is configured such that (1) in accordance with a displaying state of the page which is being displayed and on which the operation of turning over the page has been conducted by the user, the switching means switches between (i) the reduction means displaying and (ii) the reduction means not displaying the entire page which is being displayed and on which the operation of turning over the page has been conducted.

With the configuration, the display device of the present invention can switch between (i) displaying and (ii) not displaying the entire page in accordance with the displaying state of the page on which the operation of turning over the page has been conducted by the user. Accordingly, the display device of the present invention can conduct an operation suitable for a state in which the display device is used by the user. Therefore, the display device of the present invention can further improve convenience for the user.

The display device of the present invention is configured such that (1) the reduction means is at least capable of displaying, as the displaying state, a state in which display is carried out so that a horizontal width of the page which is being displayed matches a horizontal width of a display section of the display device; and (2) in a case where the page, which is being displayed and on which the operation of turning over the page has been conducted by the user, is displayed in the displaying state, the switching means carries out switching so that the reduction means does not display the entire page which is being displayed.

With the configuration, in a case where the page on which the user has conducted the operation of turning over the page is displayed so that the horizontal width of the page matches the horizontal width of the display section of the display device, the display device of the present invention carries out switching so that the entire page is not displayed. Accordingly, the display device of the present invention can conduct an operation suitable for a state in which the display device is used by the user. Therefore, the display device of the present invention can further improve convenience for the user.

The display device of the present invention is configured such that (1) when a user conducts the operation of turning over the page, the reduction means displays a visual effect in conjunction with the operation of turning over the page, before displaying the entire page to be displayed in accordance with the operation of turning over the page.

With the configuration, after displaying the visual effect in conjunction with the operation of turning over the page, the display device of the present invention displays the entire page to be displayed in accordance with the operation of turning over the page. This allows the user to have a feeling as if the user had at hand a conventional book printed in paper and were turning over a page of the book. Therefore, the display device of the present invention can further improve convenience for the user.

The display device of the present invention is configured such that (1) the magnification means magnifies the given part around given origin of coordinates.

With the configuration, the display device of the present invention can magnify the given part around predetermined origin of coordinates or origin of coordinates which is obtained by a given calculation. The "origin of coordinates" indicates coordinates of a point at which display coordinates do not change during magnification. Such origin of coordinates can be determined or calculated in accordance with, for example, (a) a binding direction of an electronic book (right-opening or left-opening) and (b) a direction in which the user conducts the operation of turning over the page.

This makes it possible to flexibly change how to carry out magnification display in accordance with a viewing state of the user. Therefore, the display device of the present invention can further improve convenience for the user.

The display device of the present invention is configured such that (1) the reduction means is at least capable of displaying, as the displaying state of the page, a state in which display is carried out so that a horizontal width of the page matches a horizontal width of a display section of the display device; and (2) the magnification means initializes the given magnification ratio, in a case where the reduction means changes the displaying state of the page.

With the configuration, in a case where (i) the page is displayed in such a state that the horizontal width of the page which is being viewed by the user matches the horizontal width of the display section of the display device and (ii) the user changes the displaying state of the page to a different displaying state, the display device of the present invention initializes the magnification ratio.

This allows the display device of the present invention to prevent a mismatch of the magnification ratio which mismatch is caused by the change in displaying state. Therefore, the display device of the present invention can further improve convenience for the user.

The display device of the present invention is configured such that (1) in a case where blank spaces having identical widths occur in respective right and left end parts of or respective upper and lower end parts of the display section when the page to be displayed is magnified, the magnification means regards a center of the display section as magnifying origin of coordinates.

With the configuration, in a case where blank spaces having identical widths occur in the respective right and left end parts of or the respective upper and lower end parts of the display section when the page to be displayed next is magnified, the display device of the present invention can magnify the page around the center of the display section which center is the origin of coordinates. In a case where (i) the user conducts the operation of turning over the page so that the display device magnifies the page to be displayed next, (ii) even after the page is magnified, blank spaces having identical widths occur in the respective right and left end parts (in this case, blank spaces having identical widths exist in the respective right and left end parts before the magnification), and (iii) the page is magnified around upper left of the display section, positions, where to display while each displaying an effect of interpolating with reference to the display carried out before the magnification and the display carried out after the magnification, do not match each other before and after the magnification.

With the configuration, the display device of the present invention can cause positions, where to display while each displaying an effect, to match each other before and after the magnification. Therefore, the display device of the present invention can further improve convenience for the user.

INDUSTRIAL APPLICABILITY

The present invention is applicable to an electronic book reader, a tablet terminal, a mobile phone, a smartphone, and other devices each including a display screen having a touch panel.

REFERENCE SIGNS LIST

1: Turn-over operation (operation of turning over a page)
8: Magnification ratio
15: Reduction section (reduction means, switching means)
16: Magnification section (magnification means)
70: Display section
100: Display device

The invention claimed is:
1. A display device capable of displaying an electronic book containing a content across a plurality of pages, comprising:
reduction means for displaying, in a case where (i) a part of the content is visually recognizable by magnifying and displaying the plurality of pages at a given magnification ratio and (ii) a user conducts an operation of turning over a page which is being displayed, an entire page to be displayed in accordance with the operation of turning over the page; and
magnification means for magnifying, at the given magnification ratio around a given origin of coordinates, a given part of the page to be displayed after the reduction means displays the entire page to be displayed, the given origin of coordinates being coordinates of a point at which display coordinates do not change during magnification,
wherein the given origin of coordinates is determined in accordance with: (a) a binding direction of an electronic book (right-opening or left-opening), and (b) a direction in which the user is to conduct operation of turning over the page.
2. The display device as set forth in claim 1, wherein:
in a case where the user conducts the operation of turning over the page, the reduction means displays an entire page which is being displayed and on which the operation of turning over the page has been conducted by the user, before displaying the entire page to be displayed in accordance with the operation of turning over the page.
3. A display device as set forth in claim 2, further comprising:
switching means for switching between (i) the reduction means displaying and (ii) the reduction means not displaying the entire page which is being displayed and on which the operation of turning over the page has been conducted.
4. The display device as set forth in claim 3, wherein:
in accordance with a displaying state of the page which is being displayed and on which the operation of turning over the page has been conducted by the user, the switching means switches between (i) the reduction means displaying and (ii) the reduction means not displaying the entire page which is being displayed and on which the operation of turning over the page has been conducted.
5. The display device as set forth in claim 4, wherein:
the reduction means is at least capable of displaying, as the displaying state, a state in which display is carried out so that a horizontal width of the page which is being displayed matches a horizontal width of a display section of the display device; and
in a case where the page, which is being displayed and on which the operation of turning over the page has been conducted by the user, is displayed in the displaying state, the switching means carries out switching so that the reduction means does not display the entire page which is being displayed.
6. The display device as set forth in claim 1, wherein:
when a user conducts the operation of turning over the page, the reduction means displays a visual effect in conjunction with the operation of turning over the page, before displaying the entire page to be displayed in accordance with the operation of turning over the page.
7. The display device as set forth in claim 1, wherein:
the reduction means is at least capable of displaying, as the displaying state of the page, a state in which display is carried out so that a horizontal width of the page matches a horizontal width of a display section of the display device; and
the magnification means initializes the given magnification ratio, in a case where the reduction means changes the displaying state of the page.
8. The display device as set forth in claim 1, wherein:
in a case where blank spaces having identical widths occur in respective right and left end parts of or respective upper and lower end parts of the display section when the page to be displayed is magnified, the magnification means regards a center of the display section as magnifying origin of coordinates.
9. A method of controlling a display device capable of displaying an electronic book containing a content across a plurality of pages, said method comprising the steps of:
(A) reducing and displaying, in a case where (i) a part of the content is visually recognizable by magnifying and displaying the plurality of pages at a given magnification ratio and (ii) a user conducts an operation of turning over a page which is being displayed, an entire page to be displayed in accordance with the operation of turning over the page; and
(B) magnifying and displaying, at the given magnification ratio around a given origin of coordinates, a given part of the page to be displayed after the entire page to be displayed is displayed in the step (A), the given origin of coordinates being coordinates of a point at which display coordinates do not change during magnification, the given origin of coordinates being determined in accordance with (a) a binding direction of an electronic book (right-opening or left-opening) and (b) a direction in which the user conducts the operation of turning over the page.

10. A non-transitory computer readable storage medium which stores a control program for causing a computer to function as a display device capable of displaying an electronic book containing a content across a plurality of pages, the display device comprising:

reduction means for displaying, in a case where (i) a part of the content is visually recognizable by magnifying and displaying the plurality of pages at a given magnification ratio and (ii) a user conducts an operation of turning over a page which is being displayed, an entire page to be displayed in accordance with the operation of turning over the page; and magnification means for magnifying, at the given magnification ratio around a given origin of coordinates, a given part of the page to be displayed after the reduction means displays the entire page to be displayed, the given origin of coordinates being coordinates of a point at which display coordinates do not change during magnification, the given origin of coordinates being determined in accordance with: (a) a binding direction of an electronic book (right-opening or left-opening) and (b) a direction in which the user is to conduct operation of turning over the page.

* * * * *